Oct. 21, 1930.         C. COTTA ET AL         1,778,970
                        TRANSMISSION
               Filed May 27, 1927        2 Sheets-Sheet 1

Inventors:
Charles Cotta
Christian R. Marthinus
By Wilson & McCanna
Attys.

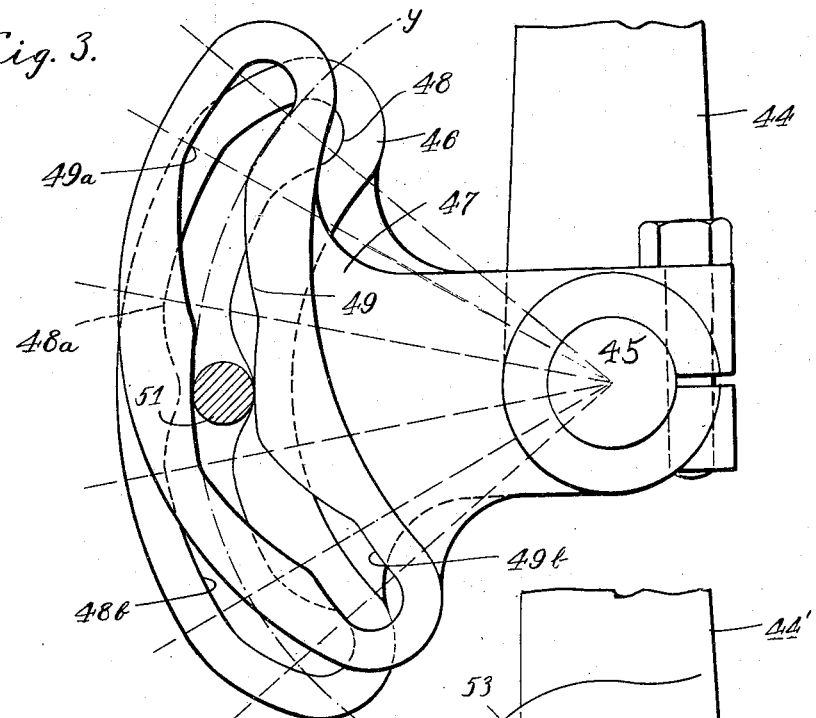
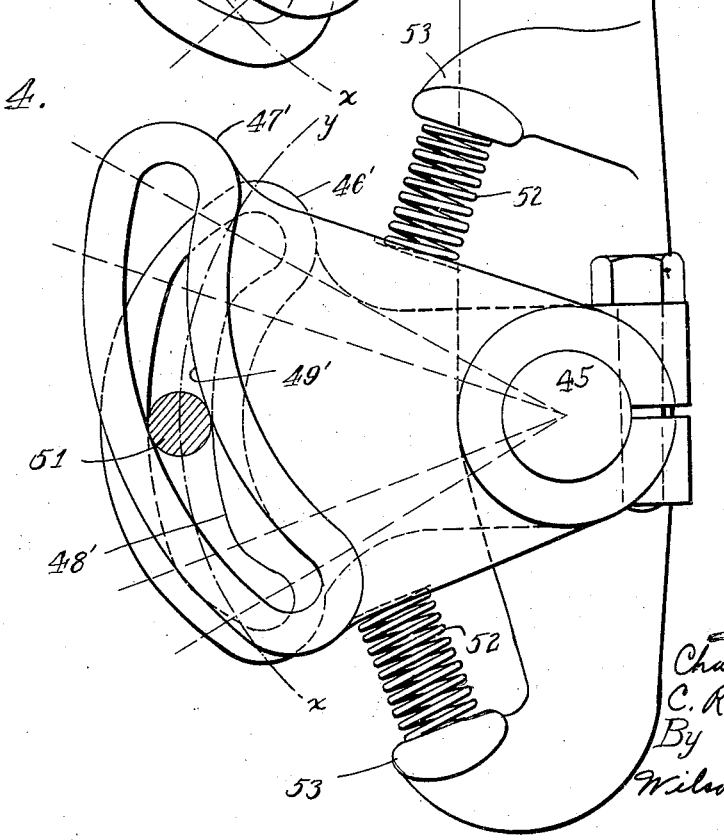

Patented Oct. 21, 1930

1,778,970

UNITED STATES PATENT OFFICE

CHARLES COTTA AND CHRISTIAN R. MARTHINUS, OF ROCKFORD, ILLINOIS, ASSIGNORS TO SAID CHARLES COTTA

TRANSMISSION

Application filed May 27, 1927. Serial No. 194,572.

This invention relates to power transmissions, and is more particularly devoted to transmissions designed for use in connection with marine engines or wherever it is desired to provide a forward and reverse drive without involving a complicated and impractical form of transmission mechanism or one which is apt is become noisy or get out of order.

The principal object of the present invention is to provide a transmission of the type referred to, controlled by a single lever which when shifted in one direction from a neutral position secures a forward drive and when shifted in the other direction secures a reverse drive, thus adapting the same to the requirements of marine installations. The transmission comprises an ordinary one-way clutch which simply completes the driving connection between the driving and driven shafts, and an ordinary two-way clutch which determines the direction of drive so as to drive the driven member selectively in either direction, the two clutches being controlled jointly by a novel and highly practical form of means for completing the drive in two directions under the control of the aforesaid lever, and the clutches being engaged in a predetermined relation to one another so that the two-way clutch, which is preferably of the jaw type, is insured of proper engagement upon each engagement of the one-way clutch, which may be of any ordinary friction type.

Figure 1:
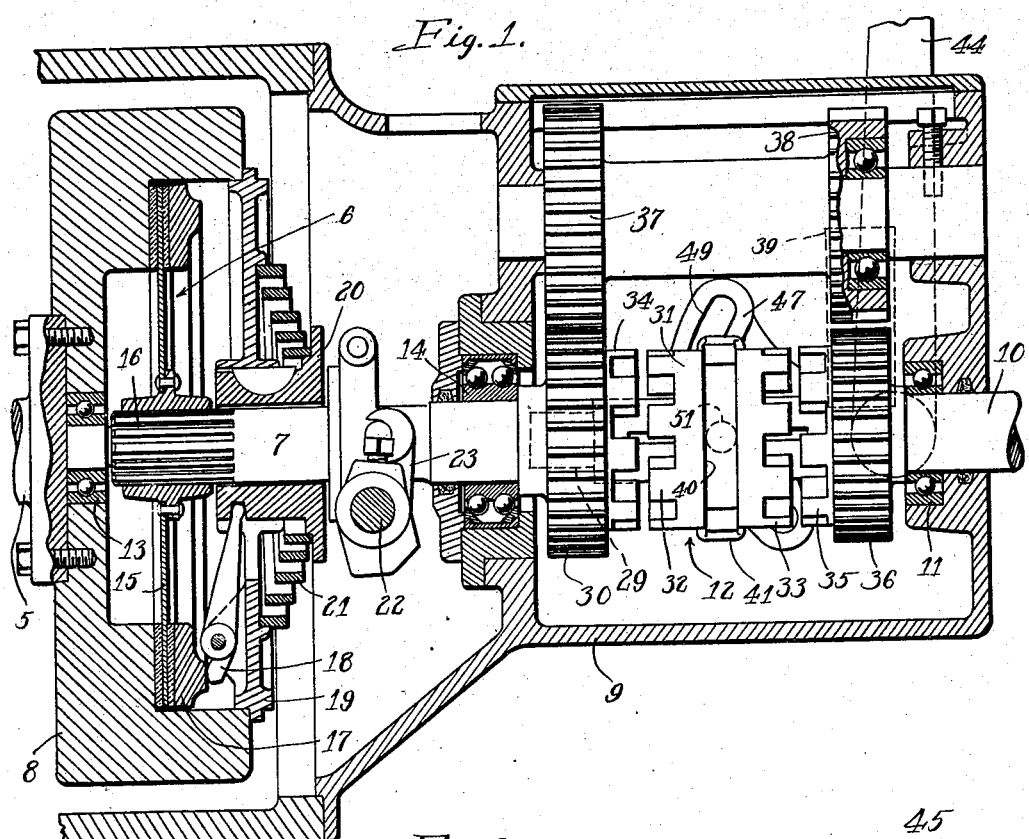
Figure 2:
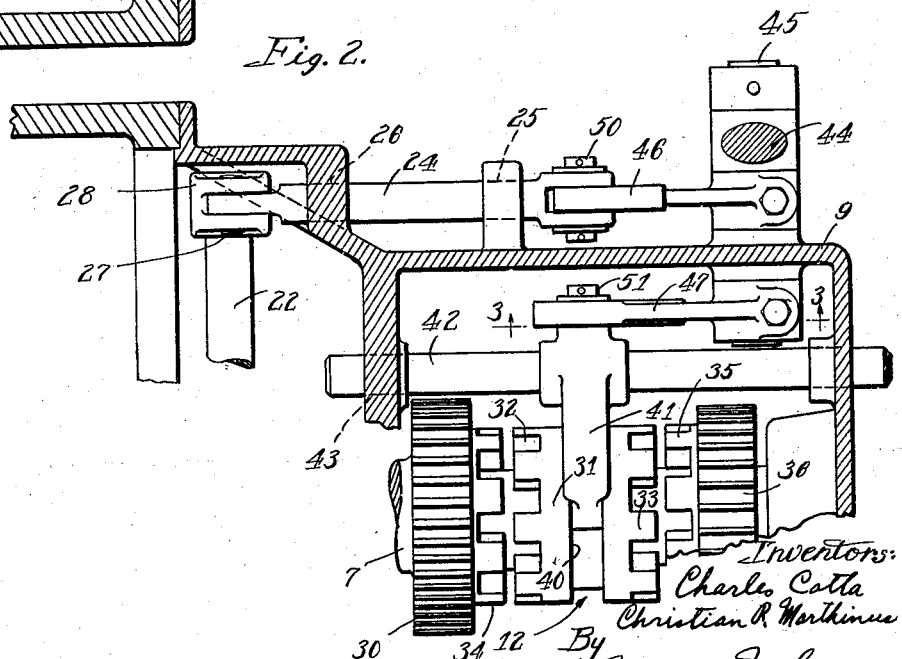

The invention is illustrated in the accompanying drawings, wherein Fig. 1 is a vertical section through the transmission clearly showing the two clutches with the first or one-way clutch engaged and the second or two-way clutch disengaged, this being the relationship of the parts with the control lever in the neutral mid-position;

Fig. 2 is a horizontal section through a portion of Fig. 1 to show the shifting mechanism in plan;

Fig. 3 is a side view of the shifting cams on an enlarged scale, the same appearing as they would if viewed on the line 3—3 of Fig. 2, except for the intervening wall of the transmission casing appearing in that figure, which is omitted; and Fig. 4 is a view corresponding to Fig. 3 of a modified or alternative construction. The same or similar reference numerals are applied to corresponding parts throughout the views.

The present invention is, of course, applicable to practically any type of internal combustion engine and for that reason only the end of the crank shaft of the engine is illustrated at 5. For the present purposes this may be regarded as the drive shaft or drive element. The one-way clutch 6 is arranged to provide a driving connection between the shaft 5 and an intermediate driven shaft 7 at the fly wheel 8 as in the case of an automobile transmission. However, the invention is not to be considered as limited to such an arrangement inasmuch as in many cases in marine units the fly wheel is mounted at the other end of the crank shaft. The gear box 9 provides a bearing at one end thereof for the propeller shaft 10, as at 11, the same being elsewhere known herein as the driven shaft. A two-way clutch 12 is arranged to transmit the drive from the intermediate shaft 7 in either direction to the driven shaft 10. Thus, briefly stated, when the two-way clutch 12 is in one of its engaged positions and the clutch 6 is also engaged, the drive will be transmitted from the shaft 5 to the shaft 10 in one direction, the reversal in direction of drive being secured by the shifting of the two-way clutch 12 to its other engaged position. The means for jointly controlling the two clutches so that the two-way clutch 12, which it will be noted is of the jaw type, will properly engage in either of its positions with the clutch 6, constitutes the subject matter of the present invention and is described in detail hereinafter.

The intermediate shaft 7 is received in front and rear bearings 13 and 14 provided in the fly wheel 8 and in a front wall of the gear box 9 respectively. The clutch 6 is of the push type and the disc 15 thereof, which is splined as at 16 on the shaft 7, is pressed against the flywheel by the pressure plate 100

17 under the action of levers 18 pivotally mounted on the back plate 19 and normally urged to their engaged position by the collar 20 under the action of the compression spring 21. The latter, it will be noted, is arranged to bear between the back plate 19 and a flange on the collar 20. Thus, movement of the collar 20 inwardly compresses the spring 21 and removes the load thereof from the levers 18 and hence releases the pressure on the plate 17 to release the clutch. A rock shaft 22 has a yoke 23 fixed thereon arranged in the rocking motion of the shaft to engage or disengage the clutch by actuation of the collar 20. No invention is claimed in the particular details of the clutch as just described, except only in so far as the same contribute toward the combinations and arrangements herein claimed to be new. Rocking motion is arranged to be transmitted to the shaft 22 for the engagement and disengagement of the clutch 6 by a reciprocable shifter rod 24 operable in bearings at 25 and 26 on the side wall of the gear box 9 and pivotally connected as at 27 to an arm 28 fixed on the end of the shaft 22.

The driven shaft 10 is received at its forward end in a bearing 29 within a gear 30 provided on the rearward end of the intermediate shaft 7. The clutch 12 comprises a collar 31 splined on the shaft 10 and provided with clutch teeth 32 and 33 at its opposite ends. The teeth 32 are arranged to intermesh with teeth 34 provided on the rear face of the gear 30 whereby to transmit the drive directly from the intermediate shaft 7 to the driven shaft 10. The teeth 33 on the other hand are arranged to intermesh with teeth 35 provided on the forward face of a gear 36 mounted freely on the shaft 10. The gear 36 is arranged to be driven from the intermediate shaft 7 but in the reverse direction to the gear 30 through the gear train 30—37, 38—39 and 39—36. The gear 39 is a reverse idler gear and is indicated in dotted lines because it occurs in front of the plane of section. Obviously then, when the collar 31 is shifted to the right in Fig. 1, the shaft 10 will be driven in the reverse direction to the shaft 7. The particular details whereby the two-way drive is secured at the clutch 12 also forms no part of the present invention, except only in so far as they contribute toward the arrangements and combinations herein claimed to be new. The collar 31 is annularly grooved as at 40 to receive the shifter yoke or fork 41 mounted on the shaft 42 received in bearings as at 43 in the front and rear walls of the gear box 9.

According to the present invention, the clutches 6 and 12 are jointly controlled by a single lever 44 which is either operated directly by the pilot who grasps the handle end thereof, or is operated through intermediate linkage from the pilot's cabin. The lever 44 is fixed to a rock shaft 45 and is arranged through the medium of the operating connections, which will now be described, to operate the shifting rod 24 and yoke 41 to engage the clutches 6 and 12 for forward drive when the lever is swung forwardly from the neutral mid-position, in which the same appears, and to engage the clutches 6 and 12 for reverse drive when the lever is swung to the rear from the neutral mid-position. Two sector-shaped cams 46 and 47 are suitably fixed on the rock shaft 45 in the relationship clearly shown in Fig. 3 and have cam slots 48 and 49 respectively which receive pins 50 and 51 respectively to provide operating connections with the rod 24 and yoke 41. The two slots deviate from the dot and dash arc XY, which is taken as a normal in Fig. 3, to the extents illustrated, the deviation one way or another causing the lineal movement of the rod or yoke correspondingly one way or another in the rocking of the cams with the shaft 45 in a manner believed to be self-evident. Assume for the moment that the control lever 44 is thrown forwardly, that is, is moved in a counter-clockwise direction as viewed in Figs. 1 and 3; the two cams are, of course, correspondingly shifted. The pin 50, due to the outwardly offset portion 48$^a$ of the slot 48, is moved to the left from the position illustrated and at the limit of the movement of the cam is moved back again to its first position. The pin 51 on the other hand, is moved to the left due to the outwardly offset part 49$^a$ of the slot 49 and at the limit of the movement of the cam remains displaced to the left relative to the normal position shown. Applying this information to a reading of Figs. 1 and 2, it will thus be evident that the shifting rod 24 for the clutch 6 is moved to the left and back again, whereas the shifting yoke 41 is moved to the left and remains in that position. Observing Fig. 1 in particular, it will now be evident that the clutch 6, which at the outset is engaged, is first disengaged when the lever 44 is swung forwardly, then (comparing the angular relationship of the offset portions 48$^a$ and 49$^a$ of the slots 48 and 49 by reference to the dotted radial lines in Fig. 3) the clutch 12 is shifted to engage the teeth 32 with the teeth 34, and immediately thereafter the clutch 6 is reengaged. In other words, the operation of the cams 46 and 47 by the lever 44 results in such timed operation of the rod 24 and yoke 41 that the engagement of the jaw clutch is positively insured and the engagement of the friction clutch does not occur until the engagement of the jaw clutch is completed. The jaw clutch is rendered certain of engagement because the friction clutch is disengaged and engaged for each engagement of the jaw clutch and likewise for each disengagement thereof, thus insuring that the gears 30 and 36 will be in motion whenever it is desired to engage the jaw clutch; there is never apt to be a situation where the teeth 32—34 or 33—35 will not mesh such as would otherwise be the case. It is hardly necessary to trace out in as much detail the operation resulting when the lever 44 is thrown to the rear for the reverse drive since it is evident upon observation of the cam slots 48 and 49 in Fig. 3 that the only difference in this operation is that the pin 51 is shifted to the right from the normal or neutral position illustrated whereby to engage the clutch teeth 33 with the teeth 35. This is due to the fact that the slot 49 is offset inwardly as at $49^b$ at the lower end of the slot. The slot 48 has an outward offset $48^b$ corresponding in form to the offset $48^a$ provided on the upper end of the slot 48. The angular relationship of the offset portions of the two slots, as in the other case just described, is such as to insure the engagement of the jaw clutch 12 before the engagement of the friction clutch 6 is completed or, as a matter of fact, is commenced. Here, again, the fact that the gears are in motion when the jaw clutch is being engaged, because the friction clutch is engaged after disengagement of the jaw clutch, as previously described, makes it a matter of almost absolute certainty that the jaw clutch will engage properly.

In the modified or alternative form illustrated in Fig. 4, the cams 46′ and 47′ have the slots 48′ and 49′ thereof conformed approximately as in the cams shown in Fig. 3, the principal noteworthy exception being that the middle portion of the slot 48′ is not offset relative to the normal arc XY as in the form previously described. In other words, in the present form both the clutch 6 and the clutch 12 are disengaged when the control lever 44′ is in the neutral mid-position. The clutch 6, due to the form of the cam slot 48′, remains disengaged until the lever arrives near either of the limit positions for forward and reverse drive. The cam 46′, it will be noted, is fixed to rock with the shaft 45 so that it is positively operated with the lever 44′, whereas the cam 47′ is mounted freely on the rock shaft 45 and is arranged to be moved yieldingly in either direction by the lever 44′, there being compression springs 52 acting between the opposite sides of the cam and fingers 53 formed integral with the lever 44′ and projecting in spaced relation to the sides of the cam. With this arrangement it will be obvious that when the lever 44′ is thrown forwardly, for example, the cam 46′ will be moved positively to bring about the engagement of the clutch 6 at the limit of the movement of the lever. The spring 52 bearing against the top of the cam 47′ will be placed under compression tending to shift the clutch 12 to the left. If, however, the teeth 32 should not chance to mesh with the teeth 34, the clutch 12 will not engage for an instant until the gear 30 commences to turn due to the engagement of the clutch 6. In other words, the other type of control permits of positive shifting of the two clutches by reason of the fact that the gears 30 and 36 are turning relative to the sleeve 31 at the time that the clutch 12 is shifted, thus insuring the engagement either of the teeth 32 and 34 or the teeth 33 and 35, as the case may be. In the present case, however, where the parts are caused to be engaged from a standstill, if the parts do not happen to be positioned so that the teeth will mesh, this meshing will occur practically immediately upon the engagement of the friction clutch.

It is believed the foregoing description conveys a clear understanding of our invention and of its various objects and advantages. While the same has been illustrated in two specific forms, it will be obvious that it is capable of embodiment in still other forms. For that reason the appended claims have been drawn with a view to covering other legitimate modifications and adaptations considered as coming within the spirit and scope of the invention.

We claim:

1. In a power transmission, the combination of a housing having a driving shaft and a driven shaft extending into and out of opposite ends thereof, an intermediate shaft in said housing, a friction clutch for connecting the driving shaft with the intermediate shaft, a jaw clutch shiftable in either direction to connect the intermediate shaft with the driven shaft for either forward or reverse drive, a shifter rod having connection with said friction clutch and shiftable back and forth for disengaging and engaging the same, a shifter yoke having connection with the jaw clutch and shiftable in either direction to engage the latter for either forward or reverse drive, the shifter rod and shifter yoke being movable in parallel directions, a rock shaft bearing in said housing, means outside the housing for communicating rocking motion to said shaft, and a pair of cam sectors mounted on said shaft to rock therewith, both of said sectors having cam-shaped slots receiving pins provided respectively on the shifter rod and shifter yoke and being so conformed that in the rocking of said shaft in one direction the shifters both move in one direction to engage the clutches for driving in a certain direction and when rocked in the other direction the two shifters are moved in different directions to engage the clutches for driving in the opposite direction.

2. In a power transmission, the combination with a driving shaft and a driven shaft, of an intermediate shaft, a friction clutch for connecting the driving shaft with the intermediate shaft, jaw clutching means shiftable in opposite directions to connect the intermediate shaft with the driven shaft for forward or reverse drive, a shifter rod having connection with the friction clutch and shiftable back and forth for disengaging and engaging the same, a shifter yoke having connection with the jaw clutching means and shiftable back and forth to engage the same for forward or reverse drive, the shifter rod and shifter yoke being movable in parallel directions, a rock shaft supported in transverse relation to the shifter rod, means for communicating rocking motion to said shaft, and a pair of cam sectors interconnected for oscillation together, at least one of said cam sectors being mounted on the rock shaft to be oscillated thereby, both of said sectors having cam-shaped slots receiving pins provided respectively on the shifter rod and shifter yoke and being so conformed that in the rocking of said shaft in one direction the two shifters move in one direction to engage the clutches for driving in a certain direction and when rocked in the other direction the two shifters are moved in opposite directions to engage the clutches for driving in the opposite direction.

3. In a power transmission, the combination of a driving shaft, a driven shaft and an intermediate shaft disposed in parallel relation to one another, a housing for said shafts, a friction clutch for connecting the driving shaft with the intermediate shaft, these two shafts being coaxial, jaw clutching means shiftable in opposite directions to connect the intermediate shaft with the driven shaft for two different drives, a shifter rod and a guide rod disposed in parallel relation to one another and received in bearings in the housing walls, the shifter rod being reciprocable, shifting means operated by the shifter rod for disengaging and engaging the friction clutch, a shifter yoke mounted on the guide rod for reciprocation and connected with the jaw clutching means to engage the same for one drive when moved to one position and for the other drive when moved to the other position, a rock shaft disposed in transverse relation to the shifter rod and guide rod in a bearing in said housing, means outside the housing for communicating rocking motion to said shaft, and a pair of cam sectors interconnected for oscillation together, at least one of said sectors being mounted on the rock shaft for oscillation thereby, both of said sectors having cam-shaped slots and the one sector being directly connected with the end of the shifter rod by receiving a pin on said rod in the slot therein and the other sector having direct operating connection with the shifter yoke by receiving a pin on the yoke in the slot therein, the said cam slots being so conformed that in the rocking of said shaft in one direction the two shifters move in one direction to engage the clutches for one drive and when rocked in the other direction the two shifters are moved in opposite directions to engage the clutches for the other drive.

In witness whereof we have hereunto affixed our signatures.

CHARLES COTTA.
CHRISTIAN R. MARTHINUS.